(12) United States Patent
Nishimaki

(10) Patent No.: US 11,991,451 B2
(45) Date of Patent: May 21, 2024

(54) IMAGING DEVICE AND IMAGING PROCESSING METHOD

(71) Applicant: JVCKENWOOD CORPORATION, Yokohama (JP)

(72) Inventor: Keiji Nishimaki, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 58 days.

(21) Appl. No.: 17/955,934

(22) Filed: Sep. 29, 2022

(65) Prior Publication Data

US 2023/0023754 A1 Jan. 26, 2023

Related U.S. Application Data

(63) Continuation of application No. PCT/JP2021/047793, filed on Dec. 23, 2021.

(30) Foreign Application Priority Data

Feb. 9, 2021 (JP) ................................. 2021-018807

(51) Int. Cl.
*H04N 23/695* (2023.01)
*H04N 23/661* (2023.01)

(52) U.S. Cl.
CPC ......... *H04N 23/695* (2023.01); *H04N 23/661* (2023.01)

(58) Field of Classification Search
CPC .... H04N 21/24; H04N 21/234; H04N 23/695; H04N 23/00; H04N 23/661

USPC ...................................................... 348/211.9
See application file for complete search history.

(56) References Cited

U.S. PATENT DOCUMENTS

| 9,055,212 | B2* | 6/2015 | Shimizu ............... H04N 23/959 |
| 10,701,425 | B2* | 6/2020 | Hirabayashi ....... H04N 21/8456 |
| 10,917,653 | B2* | 2/2021 | Li ......................... H04N 19/176 |
| 10,929,978 | B2* | 2/2021 | Aoba .................. G06F 18/2431 |

(Continued)

FOREIGN PATENT DOCUMENTS

| JP | 5594842 B2 | 9/2012 |
| JP | 2014007653 A | 1/2014 |
| JP | 2018033151 A | 3/2018 |

*Primary Examiner* — Pritham D Prabhakher
(74) *Attorney, Agent, or Firm* — Nath, Goldberg & Meyer; Jerald L. Meyer

(57) ABSTRACT

An imaging device includes: an imaging unit; an imaging time information storage unit configured to store imaging time information for each imaging direction; and a distribution information generation unit configured to sequentially acquire frames from an image signal, cut out partial image information of a preset cutout range, generate distribution image information, specify an imaging direction with the longest imaging time at a predetermined determination timing, determine whether the partial image information of the cutout range acquired when the specified imaging direction is captured is included in an imaging angle of view after an imaging direction has changed, and when it is determined as being included, cut out a range corresponding to the partial image information of the cutout range acquired when the specified imaging direction is captured, from a frame to be acquired subsequently, thereby generating the distribution image information.

7 Claims, 9 Drawing Sheets

(56) References Cited

U.S. PATENT DOCUMENTS

| | | | | |
|---|---|---|---|---|
| 2010/0214449 A1* | 8/2010 | Shimizu | H04N 23/611 |
| | | | 348/240.2 |
| 2012/0057037 A1* | 3/2012 | Ono | H04N 23/66 |
| | | | 348/E5.042 |
| 2013/0120598 A1* | 5/2013 | Iwasaki | H04N 23/00 |
| | | | 348/222.1 |
| 2013/0120606 A1* | 5/2013 | Iwasaki | H04N 23/695 |
| | | | 348/222.1 |
| 2015/0334373 A1* | 11/2015 | Kubota | H04N 13/271 |
| | | | 348/49 |
| 2017/0330335 A1* | 11/2017 | Hayashi | H04N 23/63 |
| 2019/0012790 A1* | 1/2019 | Aoba | G06F 18/2414 |
| 2020/0186706 A1* | 6/2020 | Yamasaki | H04N 23/695 |
| 2021/0082141 A1* | 3/2021 | Muta | G06T 7/246 |
| 2021/0133980 A1* | 5/2021 | Aoba | G06F 18/2431 |
| 2021/0295055 A1* | 9/2021 | Oonishi | G06T 7/70 |
| 2021/0295550 A1* | 9/2021 | Wakita | H04N 7/181 |
| 2022/0172746 A1* | 6/2022 | Ikeda | G06T 11/60 |

* cited by examiner

| LIST NUMBER | PAN ANGLE | STARTING TIME | ENDING TIME | IMAGING TIME |
|---|---|---|---|---|
| No.1 | 0° (FRONT) | 9:00 | 9:05 | 5 MINUTES |
| No.2 | 10° | 9:05 | 9:18 | 13 MINUTES |
| No.3 | 20° | 9:18 | 9:20 | 2 MINUTES |

|  | IMAGING TIME AT PAN ANGLE OF −20 DEGREES (MINUTES) | IMAGING TIME AT PAN ANGLE OF 0 DEGREES (MINUTES) | IMAGING TIME AT PAN ANGLE OF +20 DEGREES (MINUTES) | RANGE TO BE CUT OUT FROM FRAME |
|---|---|---|---|---|
| 10:00 | 5 | 2 | 3 | A |
| 10:05 | 4 | 5 | 1 | B |
| 10:10 | 3 | 2 | 5 | C |

IMAGING DEVICE AND IMAGING PROCESSING METHOD

CROSS REFERENCE TO RELATED APPLICATION

This application is a Continuation of PCT Application No. PCT/JP2021/047793, filed on Dec. 23, 2021, and claims the priority of Japanese Patent Applications No. 2021-018807, filed on Feb. 9, 2021, the entire contents of them of which are incorporated herein by reference.

BACKGROUND

The present disclosure relates to an imaging device and an imaging processing method.

Conventionally, widely-used imaging devices that support high-vision have an aspect ratio of 16 to 9 (horizontal size:vertical size) for the screen for the imaging information to be processed. Such imaging devices have a high affinity with devices having a horizontally long screen with an aspect ratio of 16 to 9, such as personal computers and home TV devices, and can efficiently display the imaging information captured by the imaging devices on the screen of these devices (such as personal computers and home TV devices).

Meanwhile, even in smartphones, which have rapidly become popular in recent years, there are increasing opportunities to view imaging information streamed via an SNS (social networking service) and the like. Smartphones are often used when a display screen is vertically long, that is, used in a state when having a horizontal to vertical size ratio of 9:16. Accordingly, when smartphones are used to view the imaging information captured by an imaging device as described above, the horizontally long imaging information is displayed in a part of the vertically long display screen, for example, in the center thereof, resulting in a margin or a black band at the top or the bottom of the screen. There has been a problem that when a margin or a black band occurs in the screen, the display size of the imaging information becomes smaller due to the occurrence of the margin or the black band, and thus the visibility decreases for smartphone users.

In terms of such a technical problem, Patent Literature 1 discloses a technique for extracting an important region from a frame of captured imaging information, and cutting out and distributing the extracted region. By using this technique, a vertically long region portion can be cutout from a horizontally long imaging information and distributed to user's smartphones.

SUMMARY

However, when an imaging direction changes during the distribution of video information captured by an imaging device, even if the change of the imaging direction is temporary and the angle of change in the imaging direction is small, the angle of view of the video information distributed in association with the above change also changes each time. As a result, the angle of view is not stable, and thus video information with low visibility is sometimes distributed.

An imaging device of the present embodiment includes: an imaging unit configured to output an image signal by performing imaging processing; an imaging time information storage unit configured to store imaging time information in which an imaging time is calculated for each imaging direction implemented by the imaging unit, with respect to the imaging processing performed by the imaging unit in the past; and a distribution information generation unit configured to sequentially acquire frames from the image signal, cut out partial image information of a preset cutout range from the respective acquired frames, and generate distribution image information. The distribution information generation unit specifies the imaging direction with the longest imaging time at a predetermined determination timing, from among the imaging time information stored in the imaging time information storage unit, determines whether the partial image information of the cutout range in a frame acquired when the specified imaging direction is captured is included in an imaging angle of view implemented during current imaging processing, and when it is determined as being included, cuts out a range corresponding to the partial image information of the cutout range acquired when the specified imaging direction is captured, from a frame to be acquired subsequently, thereby generating the distribution image information.

Further, an imaging processing method of the present embodiment in which an imaging device, which is capable of changing an imaging direction in a horizontal direction, includes an imaging unit configured to output an image signal by performing imaging processing, and the imaging device stores imaging time information for which an imaging time is calculated for each imaging direction with respect to the imaging processing performed by the imaging unit in the past, sequentially acquires frames from the image signal, cuts out partial image information of a preset cutout range from the respective acquired frames, generates distribution image information, specifies the imaging direction with the longest imaging time at a predetermined determination timing, from among the stored imaging time information, determines whether the partial image information of the cutout range in a frame acquired when the specified imaging direction is captured is included in an imaging angle of view implemented during current imaging processing, and when it is determined as being included, cuts out a range corresponding to the partial image information of the cutout range acquired when the specified imaging direction is captured, from a frame to be acquired subsequently, thereby generating the distribution image information.

DETAILED DESCRIPTION

In the following description, an embodiment of the present invention will be described regarding an imaging device capable of generating image information that can be suitably displayed on a vertically long display screen of a smartphone (aspect ratio 9:16) when captured horizontally long imaging information (aspect ratio 16:9) is distributed via an SNS.

First Embodiment

<Configuration of Imaging Device According to First Embodiment>

Figure 1:
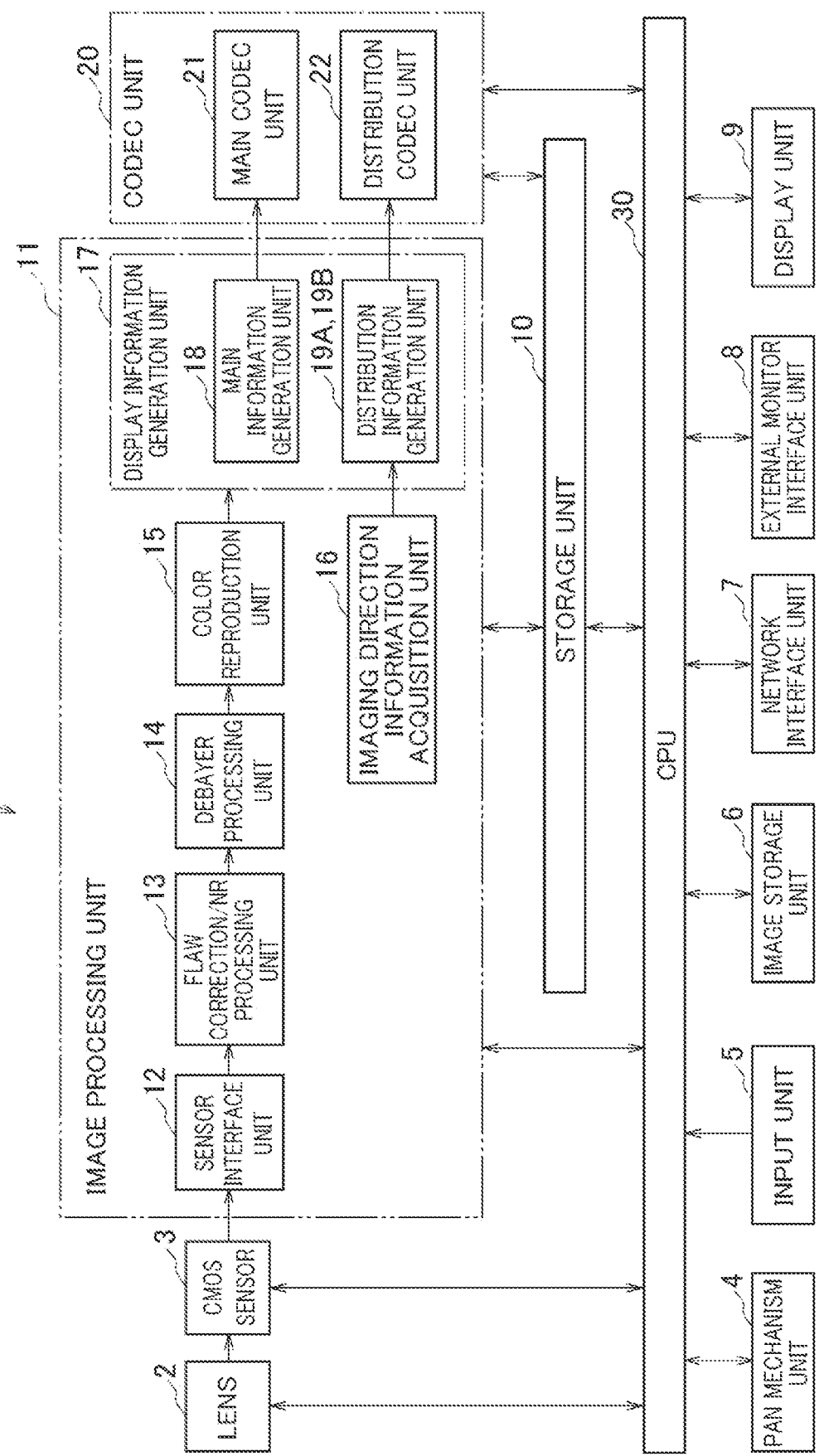
FIG. 1 is a block diagram illustrating an overall configuration of an imaging device according to a first embodiment of the present invention.

The configuration of an imaging device 1A according to the first embodiment of the present invention will be described with reference to FIG. 1, The imaging device 1A according to the present embodiment is a device that captures a video in a state in which the imaging direction can be changed in the horizontal direction, and includes a lens 2 and a CMOS (complementary MOS) sensor 3 as an imaging unit, a pan mechanism unit 4, an input unit 5, an image storage unit 6, a network interface unit 7, an external monitor interface unit 8, a display unit 9, a storage unit 10, an image processing unit 11, a codec unit 20, and a CPU (central processing unit) 30.

The lens 2 makes subject light incident. The CMOS sensor 3 is an imaging element that converts subject light incident from the lens 2 into an electrical signal. The CMOS sensor 3 outputs the converted electrical signal as an image signal such as an MIPI (mobile industry processor interface) signal, a ANDS (sub low voltage differential signaling) signal, a HiSPi (high-speed pixel interface) signal.

The pan mechanism 4 makes an imaging direction change in the horizontal direction with respect to the lens 2 based on the user's operation information. When an optical system (imaging unit) of the lens 2 is integrated with an optical system (imaging unit) of the CMOS sensor 3, the pan mechanism 4 makes the imaging direction change in the horizontal direction for the entire optical system.

The input unit 5 is configured of a key button or a touch panel, and inputs user operation information, such as information for specifying an imaging direction (pan angle) or information for instructing the generation of a distribution video for SNS distribution to a smartphone. In the present embodiment, a touch panel is provided in the display unit 9. The image storage unit 6 is a storage medium that stores information generated by the image processing unit 11 and information generated by the codec unit 20, which will be described later, and is configured of, for example, an SD memory or an SSD (solid state drive). The network interface unit 7 is an interface for connecting to a predetermined LAN (local area network), and has communication functions such as transmitting to and receiving from a smartphone in SNS distribution and communicating with an external server device. When the input unit 5 or the display unit 9 is omitted for cost reduction, the user's operation information may be reported to the CPU 30 using a LAN via the network interface unit 7.

The external monitor interface unit 8 is an interface for connecting to an external television device or display device (not illustrated), and for example, the HDMI (registered trademark) (high-definition multimedia interface) or SDI (serial digital interface) standard is used. The display unit 9 is a small monitor for checking the captured video information, such as an LCD (liquid crystal display) with a touch panel, or an EL display. The storage unit 10 is a storage medium used when executing processing in the image processing unit 11 and the codec unit 20, and is configured of, for example, a DDR4 (double-data-rate 4) memory or a hard disk.

The image processing unit 11 includes a sensor interface unit 12, a flaw correction/NR (noise reduction) processing unit 13, a DeBayer processing unit 14, a color reproduction unit 15, an imaging direction information acquisition unit 16, and a display information generation unit 17.

The sensor interface unit 12 receives an image signal output from the CMOS sensor 3, converts serial data into parallel data, and sequentially generates such parallel data as a frame. Further, the sensor interface unit 12 extracts a horizontal synchronization signal and a vertical synchronization signal from the received image signal, and replaces them with a synchronization signal inside the imaging device 1A. The storage unit 10 may be used to execute this processing.

The flaw correction/NR processing unit 13 acquires frames sequentially generated by the sensor interface unit 12 as information to be processed, and executes interpolation processing of so-called flaw data included in the frame, and noise reduction processing. The noise reduction processing may be either 2-dimensional noise reduction (2DNR), which executes processing on a frame-by-frame basis, or 3-dimensional noise reduction (3DNR), which analyzes consecutive frames and executes processing. The storage unit 10 may be used to execute this processing.

When the CMOS sensor 3 corresponds to the Bayer structure of R, Gr, Gb, and B, the DeBayer processing unit 14 converts the frame acquired from the sensor interface unit 12 into the R, G, and B structure by means of DeBayer processing. When the CMOS sensor 3 supports monochrome or the 3-CMOS structure, no DeBayer processing is executed on the acquired frame. The color reproduction unit 15 executes gamma correction processing, and color management processing in accordance with a preset white balance, with respect to the acquired frame.

Based on the operation of the pan mechanism unit 4, the imaging direction information acquisition unit 16 acquires, through the CPU 30, a pan angle corresponding to the imaging direction of the current lens 2 produced when the front direction of the imaging device 1A is 0 degrees.

The display information generation unit 17 includes a main information generation unit 18 and a distribution information generation unit 19A, and acquires an image signal, which is acquired from the CMOS sensor 3, as imaging processing information via the sensor interface unit 12, the flaw correction/NR processing unit 13, the DeBayer processing unit 14 and the color reproduction unit 15. The main information generation unit 18 generates display image information with an aspect ratio of 16 to 9 compatible with a display screen such as a high-definition TV from the acquired frame of imaging processing information. The generated display image information is sequentially transmitted from the storage unit 10 to the image storage unit 6 by the CPU 30, and recorded as main video information.

Figure 2:
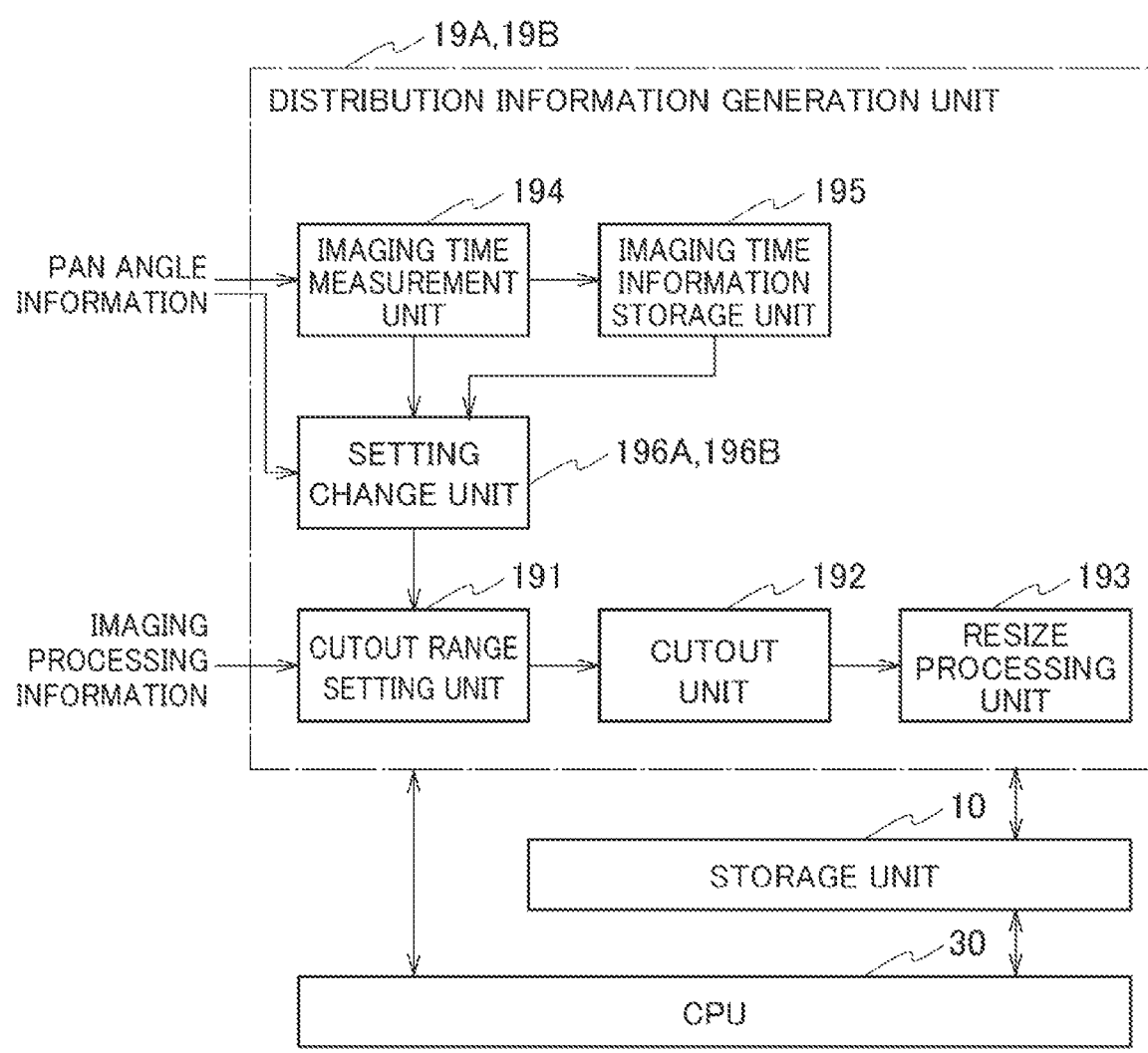
FIG. 2 is a block diagram illustrating the configuration of a distribution information generation unit in the imaging device according to the first embodiment of the present invention.

The distribution information generation unit 19A generates distribution image information from the acquired frame of imaging processing information as display information with an aspect ratio of 9 to 16 to be displayed on a vertical display screen such as a smartphone (not illustrated). The generated distribution image information is sequentially transmitted from the storage unit 10 to the image storage unit 6 by the CPU 30, and recorded as the distribution video information. Hereafter, a frame of the imaging processing information to be acquired by the main information generation unit 18 and the distribution information generation unit 19A is simply referred to as "a frame". The detailed configuration of the distribution information generation unit 19A will be described with reference to FIG. 2. The distribution information generation unit 19A includes a cutout range setting unit 191, a cutout unit 192, a resize processing unit 193, an imaging time measurement unit 194, an imaging time information storage unit 195, and a setting change unit 196A.

The cutout range setting unit 191 sets a range indicated by a predetermined size and position within the acquired frame as a first cutout range. Also, during the generation processing of distribution image information, the cutout range setting unit 191 changes a cutout range based on an instruction from the setting change unit 196A described later.

The cutout unit 192 cuts out partial image information of the cutout range set by the cutout range setting unit 191 from the acquired frame. The resize processing unit 193 resizes the partial image information cut out by the cutout unit 192 for display with an aspect ratio of 9 to 16, and generates the distribution image information.

The imaging time measurement unit 194 measures an imaging time for each pan angle acquired from the imaging direction information acquisition unit 16 during the generation of distribution image information. Also, when the imaging time measuring unit 194 detects that a pan angle has changed during the generation of distribution image information, the imaging time measurement unit 194 calculates an imaging time at the pan angle before the change and stores the imaging time in the imaging time information storage unit 195. The imaging time information storage unit 195 stores imaging time information calculated for each pan angle regarding imaging processing of the past predetermined period (for example, the past 30 minutes from the current time).

On the basis of the pan angle information acquired by the imaging direction information acquisition unit 16, the setting change unit 196A specifies the pan angle information with the longest imaging time from among the information stored in the imaging time information storage unit 195 as the information of the direction in which the user is most interested, at a determination timing at which the pan angle for imaging by using the lens 2 is detected to have changed. Thereafter, in the case where it is determined that the partial image information of the cutout range in the frame to be acquired when imaging at the specified pan angle is included in the imaging angle of view after the pan angle has changed, the setting change unit 196A changes the range to be cut out from the frame to be acquired subsequently, to the range corresponding to the cutout range captured when imaging at the specified pan angle, with respect to the cutout range setting unit 191.

Returning to FIG. 1, the codec unit 20 includes a main codec unit 21 and a distribution codec unit 22. The main codec unit 21 encodes the main video information generated and stored in the main information generation unit 18, in order to store such information in the image storage unit 6, and temporarily stores such information in the storage unit 10. Thereafter, the CPU 30 stores the data, which is temporarily stored in the storage unit 10, in the image storage unit 6 in a file format, Such encode is also performed when it is transmitted to an external server device or the like via the network interface unit 7. In addition, the main codec unit 21 decodes the encoded main video information when it is played by a display device or the like via the external monitor interface unit 8, or when it is played by the display unit 9.

The distribution codec unit 22 encodes the distribution image information generated by the distribution information generation unit 19A for distribution to an external terminal device such as a smartphone, and stores such information in the storage unit 10 as the distribution video information. Also, the distribution codec unit 22 decodes the encoded distribution video information when it is played.

The CPU 30 controls the operations of the following units described above: the imaging unit (lens 2 and CMOS sensor 3), the pan mechanism unit 4, the input unit 5, the image storage unit 6, the network interface unit 7, the external monitor interface unit 8, the display unit 9, the storage unit 10, the image processing unit 11, and the codec unit 20.

<Operation of Imaging Device According to First Embodiment>

Figure 3A:
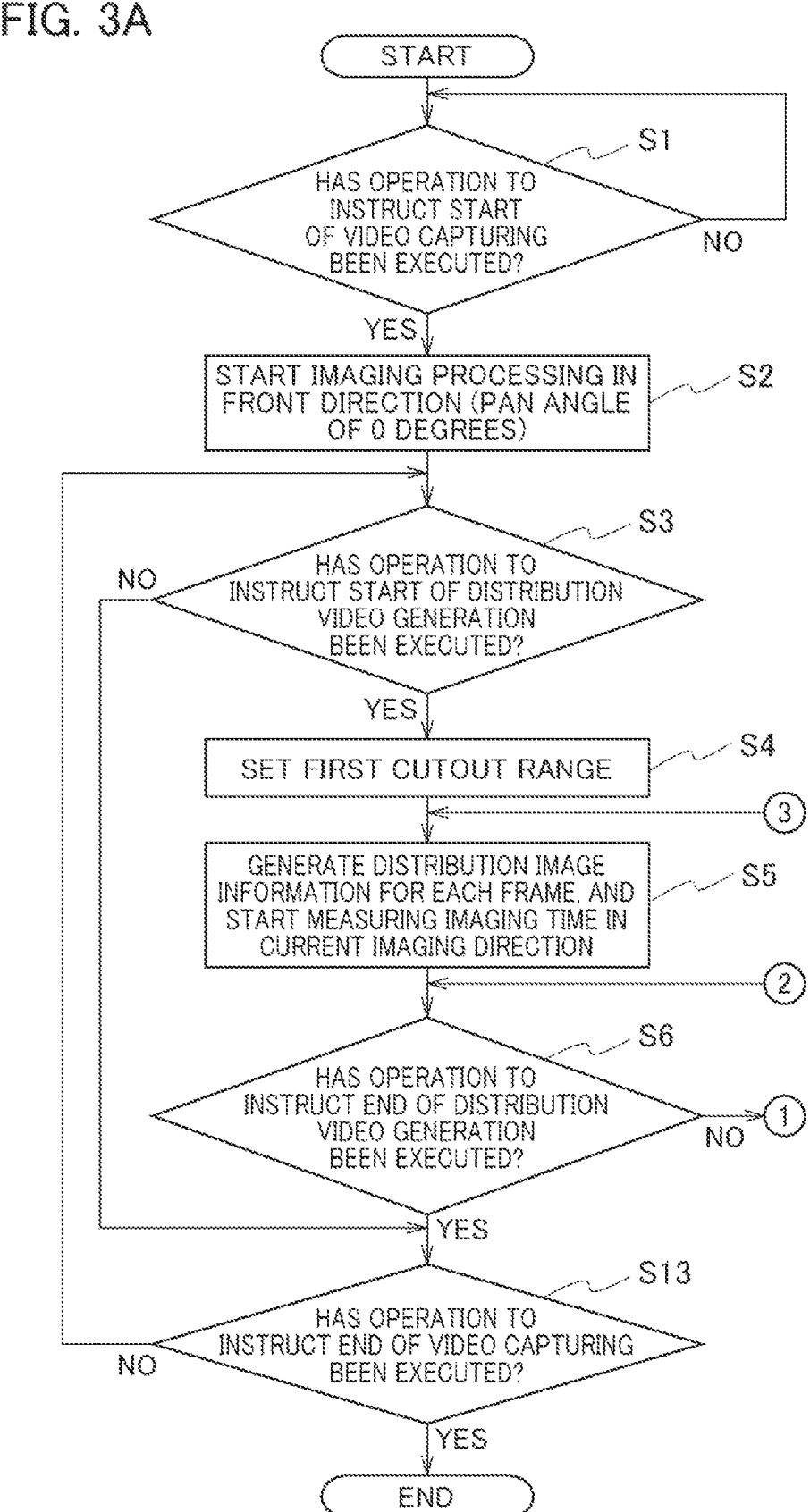
FIG. 3A is a flowchart illustrating the operation of the imaging device according to the first embodiment of the present invention.
Figure 3B:
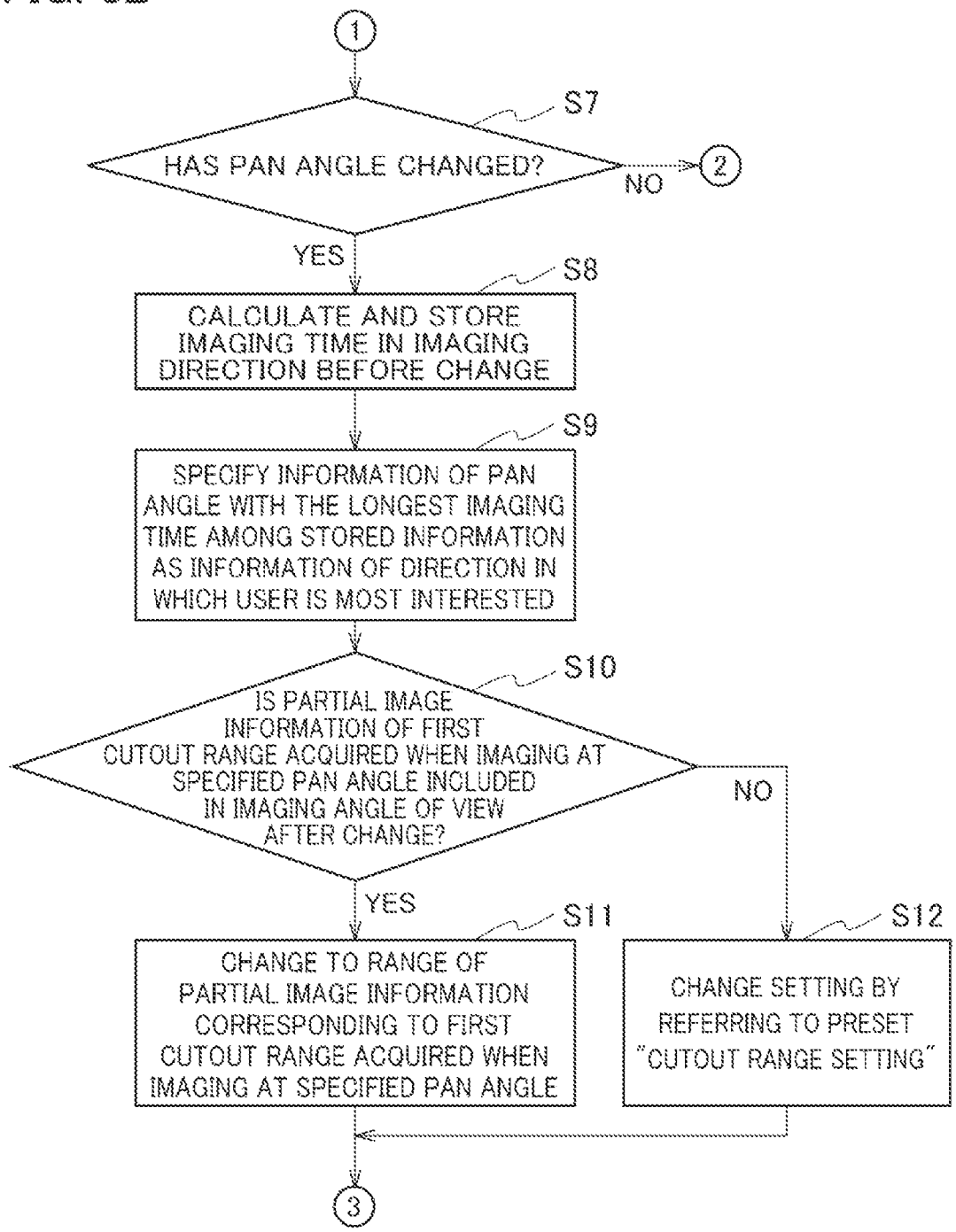
FIG. 3B is a flowchart illustrating the operation of the imaging device according to the first embodiment of the present invention.

Next, the operation of the imaging device 1A according to the present embodiment will be described with reference to the flowcharts of FIGS. 3A and 3B. First, when the user executes an operation to instruct the start of video capturing from the input unit 5 of the imaging device 1A ("YES" in S1), the video imaging processing is started with the imaging direction of the lens 2 set to the front direction with a pan angle of 0 degrees (first imaging direction D1) (S2).

Figure 4:
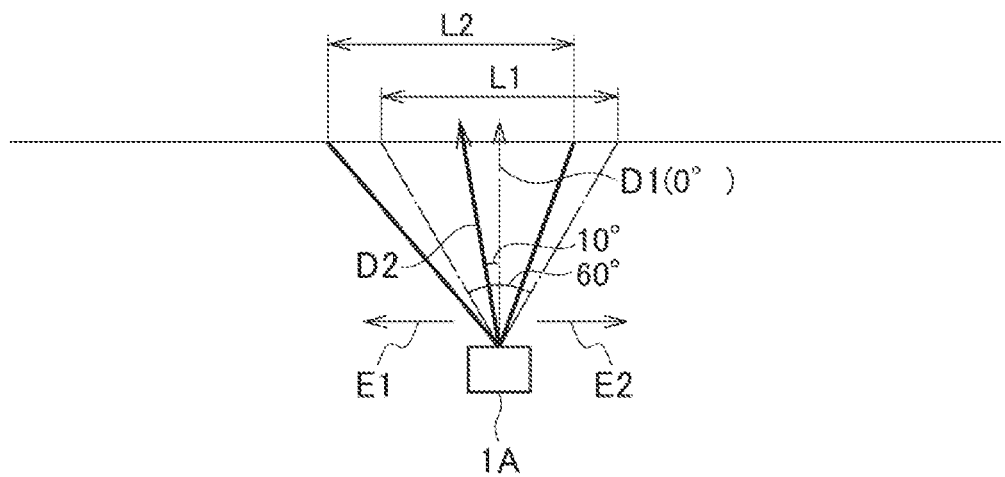
FIG. 4 is a diagram of the imaging device according to the first embodiment of the present invention and an imaging range to be captured $1w$ the imaging device when viewed from above.

FIG. 4 is a diagram of the imaging device 1A and an imaging range to be captured by the imaging device 1A when viewed from above. The horizontal angle of view (HFOV) in the imaging processing of the imaging device 1A is 60 degrees, and the range of the imaging angle of view in the horizontal direction produced when the lens 2 is set to face the first imaging direction D1 (0 degrees) indicated by the dash-dotted arrow is L1.

In imaging processing, the subject light incident from the lens 2 is converted into an electrical signal by the CMOS sensor 3, and an image signal is output. In the present embodiment, the number of pixels (Hpixel) of the CMOS sensor 3 supports Full-HD (full hi-vision), and the imaging angle of view is 1,920 pixels in the horizontal direction and 1,080 pixels in the vertical direction. The image signal output from the CMOS sensor 3 is processed by the image processing unit 11 and displayed on the display unit 9 by the CPU 30.

Figure 5:
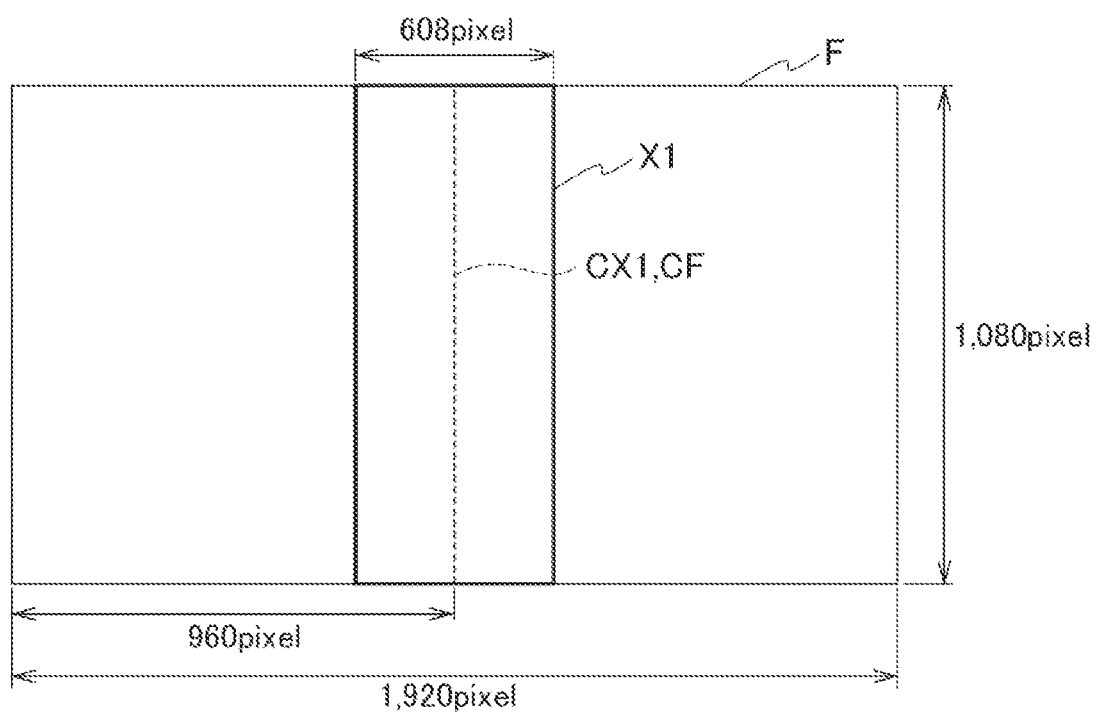
FIG. 5 is a diagram illustrating a first cutout range in a frame of video information captured by the imaging device according to the first embodiment of the present invention.

Next, when the user executes an operation to instruct the start of distribution video generation from the input unit 5 ("YES" in S3), the cutout range setting unit 191 sets a range indicated by a predetermined size and position in the acquired frame as the first cutout range X1 (S4). As illustrated by the bold line in FIG. 5, the first cutout range X1 is a rectangular range with an aspect ratio of 9 to 16 having a size corresponding to 608 pixels in the horizontal direction and 1,080 pixels in the vertical direction in the frame (1,920 pixels in the horizontal direction and 1,080 pixels in the vertical direction). The upper and lower ends of this first cutout range X1 are set to coincide with the upper and lower ends of the frame, and the center position CX1 of the first cutout range X1 in the horizontal direction is set to coincide with the center position CF of the frame in the horizontal direction (the position of 960 pixels from the left edge of the frame). That is, the first cutout range X1 is a rectangular range with an aspect ratio of 9 to 16 whose length in the vertical direction coincides with the length of the frame of the captured video information in the vertical direction, and is set to the center position of the frame in the horizontal direction.

Next, the cutout unit 192 cuts out partial image information of the first cutout range X1 set by the cutout range setting unit 191, from the first frame of the video information to be processed. The resize processing unit 193 enlarges (resizes) the partial image information for distribution, which is cut out by the cutout unit 192, at a prescribed magnification rate, and generates the distribution image information. Thereafter, the first cutout range X1 set in step S4 is cutout from the frames sequentially acquired by imaging, and the distribution image information is generated.

Also, when generation processing of the distribution image information has started, the imaging time measurement unit 194 starts measuring the imaging time in the current first imaging direction D1 (S5).

Until the operation for instructing the end of distribution video generation is executed (during generation processing of the distribution image information) ("NO" in SE), when the user executes an operation, from the input unit 5, to change the pan angle of the lens 2 from the first imaging direction D1 (0 degrees) to the second imaging direction D2 shifted by 10 degrees in the left direction, as illustrated by the bold arrow in FIG. 4 ("YES" in S7), the range of the imaging angle of view in the horizontal direction becomes L2. When the pan angle has changed, the imaging direction information acquisition unit 16 acquires information of the pan angle of 0 degrees before the change, and information of the pan angle of 10 degrees after the change.

Using the information acquired by the imaging direction information acquisition unit 16, the imaging time measurement unit 194 calculates the imaging time in the first imaging direction D1 before the change and stores it in the imaging time information storage unit 195 (S8). Here, the imaging time in the first imaging direction D1 is calculated as 5 minutes from time 9:00 to time 9:05, and stored in the imaging time information storage unit 195 as information of list number No. 1 together with information of the corresponding pan angle (0 degrees).

Next, when the setting change unit 196A detects that the imaging direction by means of the lens 2 has changed based on the pan angle information acquired by the imaging direction information acquisition unit 16, the information of the pan angle with the longest imaging time among the information stored in the imaging time information storage unit 195 is specified as the information of the direction in which the user is most interested (S9). Here, since only the imaging time information of the list number No. 1 is stored in the imaging time information storage unit 195, the pan angle of 0 degrees corresponding to the list number No. 1 is specified as the information of the direction in which the user is most interested.

Next, the setting change unit 196A determines whether or not the partial image information of the first cutout range X1 in the frame acquired when imaging the first imaging direction D1 at the specified pan angle of 0 degrees is included in the imaging angle of view in which the second imaging direction D2 is captured after the change of the imaging direction (S10).

Here, in the case where it is determined that the partial image information of the first cutout range X1 in the frame acquired when imaging the first imaging direction D1 is included in the imaging angle of view in which the second imaging direction D2 is captured ("YES" in S10), the setting change unit 196A changes the range to be cut out from the frame to be acquired subsequently, to the second cutout range X2 corresponding to the partial image information of the first cutout range X1 acquired when imaging at the specified pan angle of 0 degrees, with respect to the cutout range setting unit 191 (S11).

The calculation of the second cutout range X2 will be described in detail below. The setting change unit 196A first calculates the center position CX2 of the second cutout range X2 after the change in the horizontal direction by the following equation (1).

$$CX2 = CF + 1{,}920/2 \times (\theta b - \theta user)/\theta a \qquad (1)$$

In Equation (1), CF is the center position of the frame in the horizontal direction, θb is the current pan angle, θuser is the pan angle specified as information in the direction in which the user is most interested, and θa is horizontal viewing angle (HFOV/2) of the imaging device 1A. As illustrated by the arrow E1 in FIG. 4, regarding the imaging direction, the pan angle indicated by θb and θuser indicates the angle from 0 degrees to the left direction in the front direction of the imaging device 1A as a positive value, and as illustrated by the arrow E2 in FIG. 4, the pan angle indicated by θb and θuser indicates the angle from 0 degrees to the right direction as a negative value.

Here, CF is a position of 1,920/2=960 pixels, θb is +10 degrees, θuser is 0 degrees, and θa is 60/2=30 degrees, and thus the center position CX2 of the second cutout range X2 in the horizontal direction is calculated as follows by using the equation (1).

$$CX2 = 960 + 960 \times (+10 - 0)/30 = 1{,}280$$

Figures 6, 7:
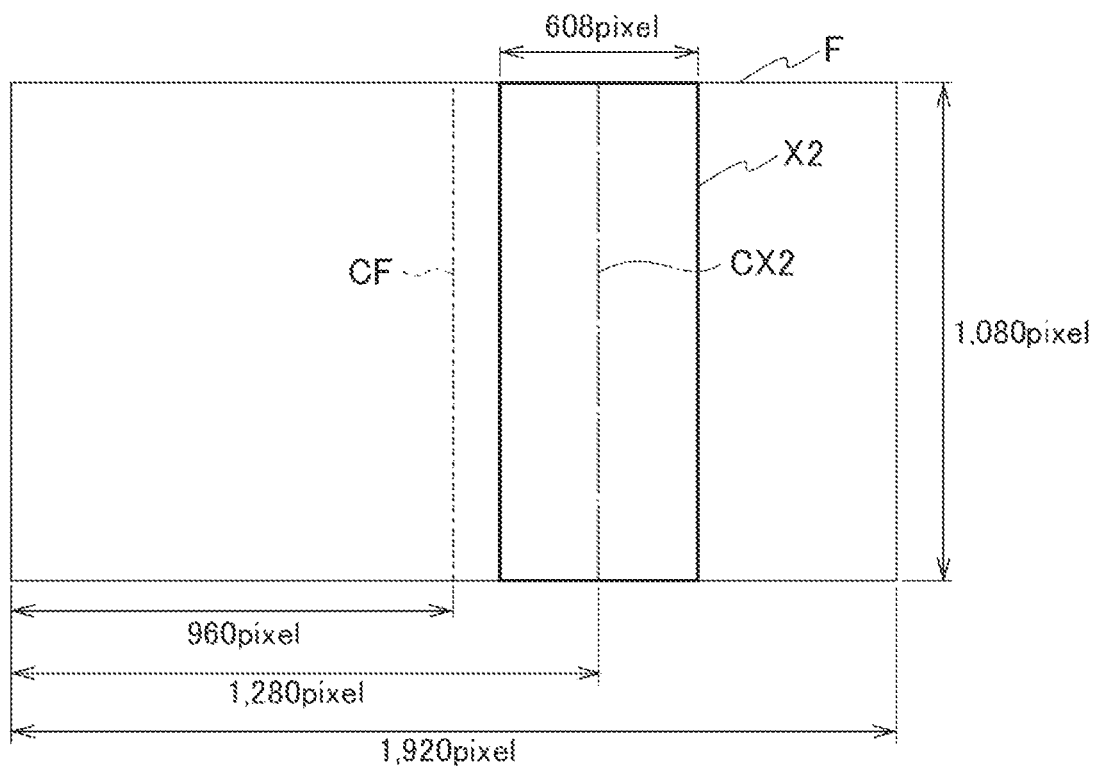
FIG. 6 is a diagram illustrating a second cutout range in a frame of video information captured by the imaging device according to the first embodiment of the present invention.
FIG. 7 is a table illustrating an example of information stored in an imaging time storage unit of the imaging device according to the first embodiment of the present invention.

As a result, the setting change unit 196A specifies the position of 1,280 pixels from the left edge of the frame as the center position CX2 of the second cutout range X2 in the horizontal direction, as illustrated in FIG. 6. Further, the range of 608 pixels in the horizontal direction and 1,080 pixels in the vertical direction centered at this center position CX2 is calculated as the second cutout range X2, and set in the cutout range setting unit 191.

In addition, in step S10, in the case where it is determined that the partial image information of the first cutout range X1 in the frame acquired when the first imaging direction D1 is captured is not included in the imaging angle of view in the imaging direction after the change because the user has greatly changed the imaging direction of the lens 2 in the horizontal direction ("NO" in S10), the setting is changed by referring to "cutout range setting" preset by the user (S12).

The "cutout range setting" is a setting value set by the user with respect to the imaging device 1A. For example, the "cutout range setting" is a setting value selected by the user from the following setting items, which are prepared for the imaging device 1A: "reset to the center of the screen (center position)" or "continue the previous angle of view position". The setting change unit 196A is set such that the setting value can be referred to. When the referred setting value is set to "reset to the center of the screen (center position)," the setting change unit 196A changes the setting of the cutout range setting unit 191 to the center of the screen. Further, when the referred setting value is set to "continue the previous angle of view position", the setting change unit 196A does not change the setting of the cutout range setting unit 191. In this case, regardless of any setting value, the cutout range is determined to be the first cutout range X1, and the first cutout range X1 is cut out from the frame to be acquired subsequently, to generate distribution image information.

The processing of steps S5 to S12 described above continues until the operation for instructing the end of distribution video generation is executed. During this time, for example, as illustrated in FIG. 7, three pieces of imaging time information: imaging time information of list number No. 1 (pan angle: 0 degrees and imaging time: 5 minutes), imaging time information of list number No. 2 (pan angle: 10 degrees and imaging time: 13 minutes), and imaging time information of list number No. 3 (pan angle: 20 degrees and imaging time: 2 minutes) are stored in the imaging time information storage unit 195. When the pan angle of the lens 2 is changed to 0 degrees, the setting change unit 196A specifies the imaging time information of the pan angle of 10 degrees as the information of the direction in which the user is most interested because the pan angle of 10 degrees of list number No. 2 is the pan angle with the longest imaging time among the three pieces of imaging time information.

When the setting change unit 196A determines that the partial image information of the first cutout range X1 in the frame acquired when the second imaging direction D2 is captured at the specified pan angle of 10 degrees is included in the imaging angle of view in which the first imaging direction D1 is captured at the pan angle of 0 degrees after the change of the imaging direction, the setting change unit 196A changes the range to be cut out from the frame to be acquired subsequently, to the third cutout range X3 corresponding to the partial image information of the first cutout range X1 acquired when the second imaging direction D2 is captured at the specified pan angle of 10 degrees. Thereafter, when the operation for instructing the end of distribution video generation is executed ("YES" in S6), the generation processing of distribution video information ends, and when the operation for instructing the end of video capturing is executed ("YES" in S13), the imaging processing ends.

By executing the processing in this way, when the distribution image information is generated by cutting out a predetermined range of image information from imaging information, even if the imaging direction has temporarily changed at a small angle due to some sort of factor such as a user's erroneous operation or a user's temporary interest, it is possible to cut out partial image information in which a user is interested and generate distribution image information with a stable angle of view without being affected by such a factor.

Second Embodiment

<Configuration of Imaging Device 1B According to Second Embodiment>

Since the configuration of an imaging device 1B according to the second embodiment of the present invention is similar to the configuration of the imaging device 1A described in the first embodiment, a detailed description of the components having the same function will be omitted.

In the present embodiment, a setting change unit 196B of a distribution information generation unit 19B of the imaging device 1B executes determination processing of a cutout range from the frame at a determination timing arriving at a predetermined time interval (5 minute interval) based on the information stored in the imaging time information storage unit 195. In the determination processing of the cutout range, the setting change unit 196B specifies the information of the pan angle with the longest imaging time in the past predetermined period (for example, the past 10 minutes from the current time) as the information of the direction in which the user is most interested. Thereafter, in the case where it is determined that the partial image information of the first cutout range X1 in the frame acquired when imaging at the specified pan angle is included in the imaging angle of view currently being captured, the setting change unit 196B changes the range to be cut out from the frame to be acquired subsequently, to the range of the partial image information corresponding to the first cutout range X1 acquired when imaging at the specified pan angle, with respect to the cutout range setting unit 191.

<Operation of Imaging Device 1B According to Second Embodiment>

Figure 8A:
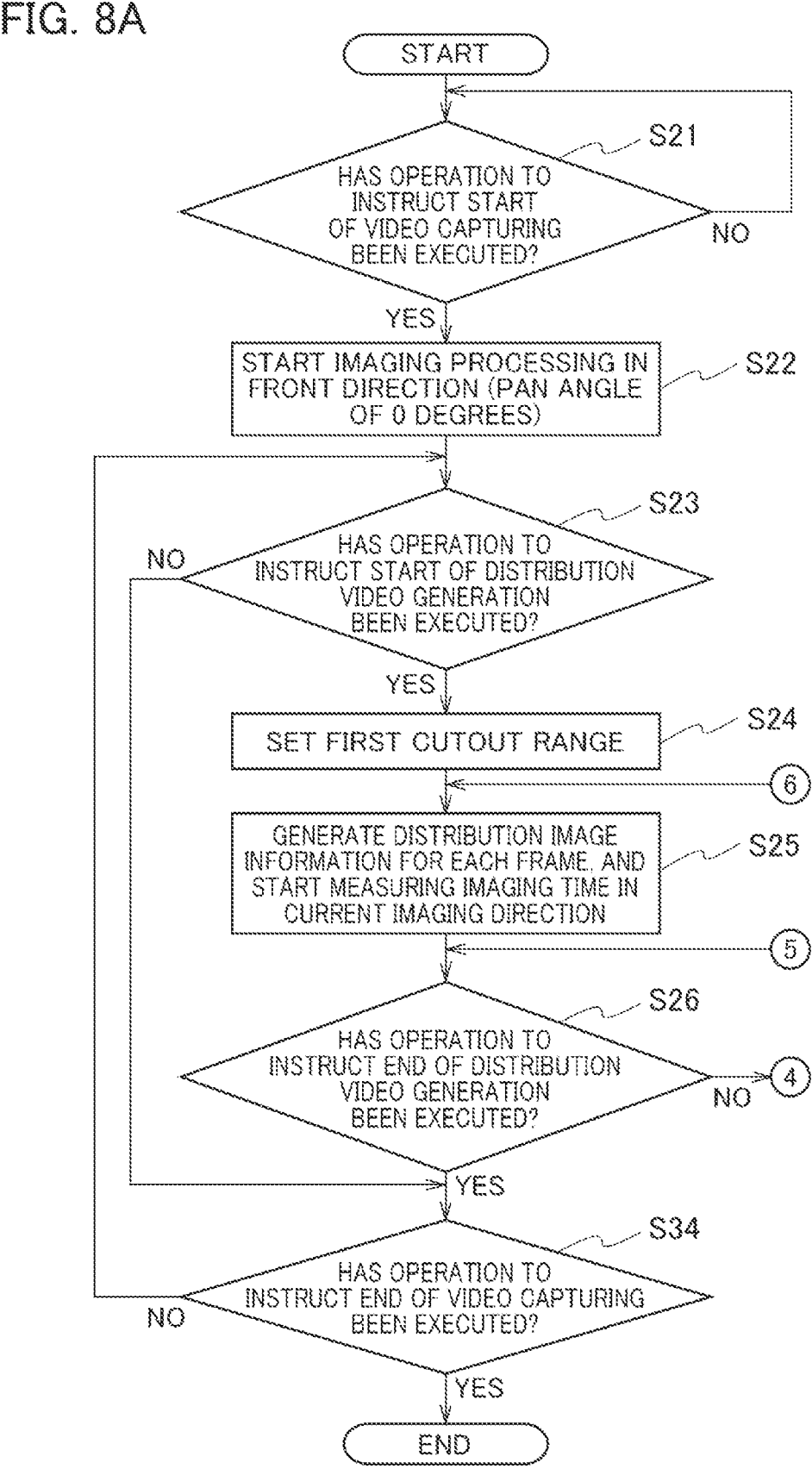
FIG. 8A is a flowchart illustrating the operation of an imaging device according to a second embodiment of the present invention.
Figure 8B:
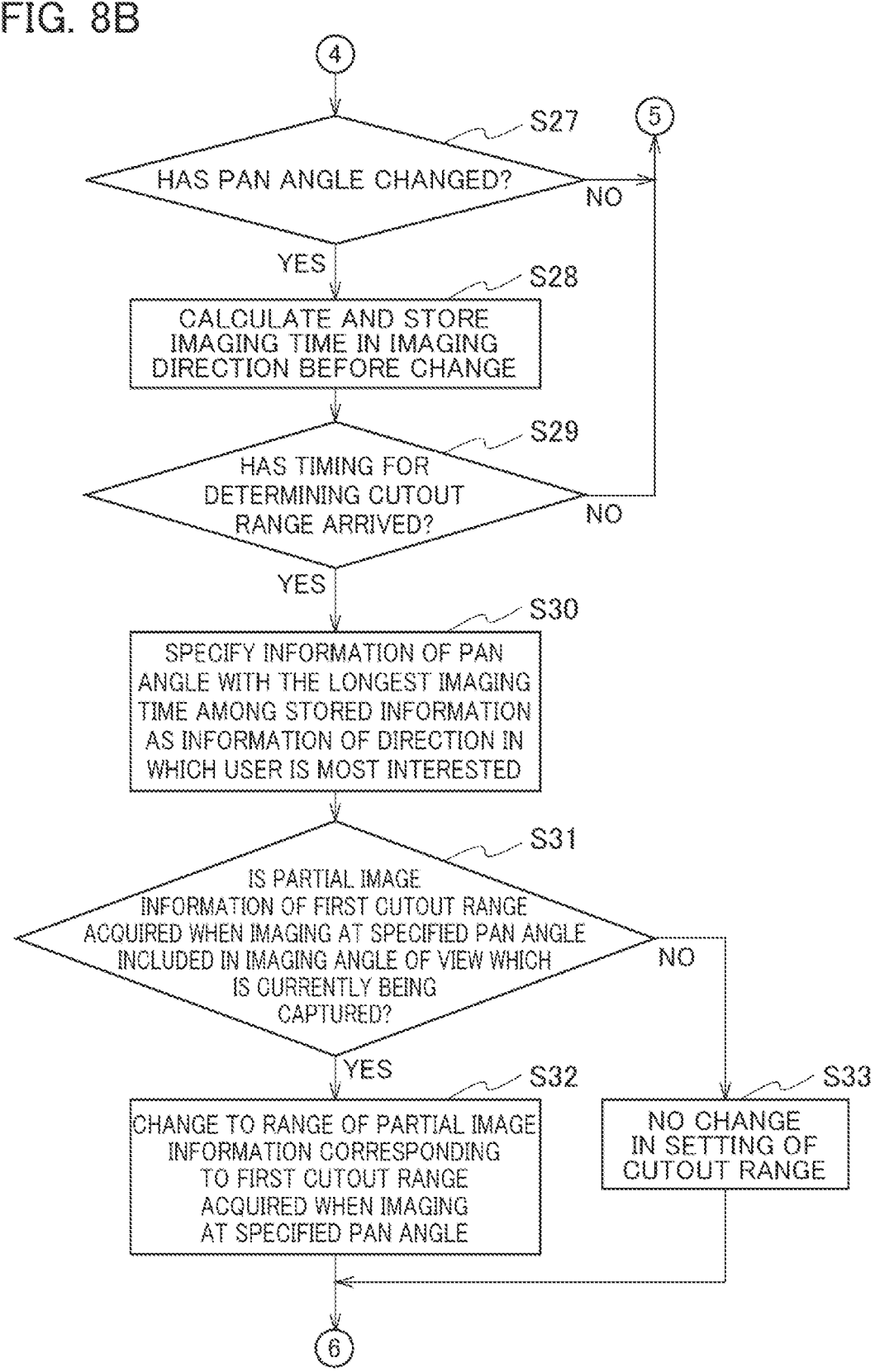
FIG. 8B is a flowchart illustrating the operation of the imaging device according to the second embodiment of the present invention.

The operation of the imaging device 1B according to the present embodiment will be described with reference to the flowcharts of FIGS. 8A and 8B. In FIGS. 8A and 8B, since the processing executed in steps S21 to S28 is similar to the processing in steps S1 to S8 described in the first embodiment, a detailed description thereof will be omitted.

Until the operation for instructing the end of distribution video generation is executed (during the generation processing of distribution image information) ("NO" in S27), in the case where the imaging time for each imaging direction is calculated and stored ("YES" in S27, S29) each time the pan angle changes, when the timing for determining the cutout range from the frame has arrived ("YES" in S29), the setting change unit 196B executes the cutout range determination processing. In this determination processing, the setting change unit 196B specifies the information of the pan angle with the longest imaging time in the past predetermined period (for example, the past 10 minutes from the current time) as the information of the direction in which the user is most interested (S30).

Then, in the case Where it is determined that the partial image information of the first cutout range X1 in the frame acquired when imaging at the specified pan angle is included in the imaging angle of view which is currently being captured (YES" in S31), the setting change unit 196B changes the range to be cut out from the frame to be acquired subsequently, to the range corresponding to the partial image information of the first cutout range X1 acquired when imaging at the specified pan angle, with respect to the cutout range setting unit 191 (S32). In this respect, when the specified pan angle is the same as the pan angle currently being captured, the setting change unit 196B does not change the setting of the cutout range setting unit 191.

Further, when it is determined in step S31 that the partial image information of the first cutout range X1 in the frame acquired when imaging at the specified pan angle is not included in the imaging angle of view after the change because the user has greatly changed the imaging direction of the lens 2 in the horizontal direction ("NO" in S31), the setting change unit 196B changes the setting by referring to the "cutout range setting" preset by the user as in the first embodiment. For example, when the referred "cutout range setting" is set to "continue the previous angle of view position", there is no change in the setting of the cutout range setting unit 191 (S33).

Figures 9, 10:
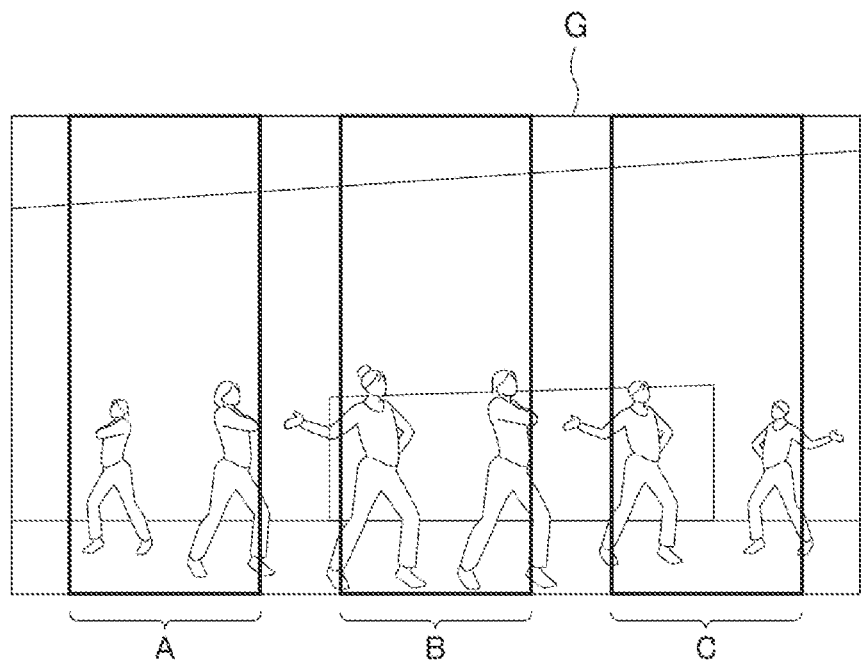
FIG. 9 is a table illustrating the direction in which a user is most interested, which is determined at predetermined time intervals in the imaging device according to the second embodiment of the present invention.
FIG. 10 illustrates a range of partial image information of the first cutout range for each pan angle within an imaging angle of view after changing a pan angle in the imaging device according to the second embodiment of the present invention.

The processing of steps S25 to S33 described above continues until the operation for instructing the end of distribution video generation is executed. By executing the processing in this way, it is assumed that, for example, as illustrated in FIG. 9, the imaging time at a pan angle of −20 degrees is 5 minutes, the imaging time at a pan angle of 0 degrees is 2 minutes, and the imaging time at a pan angle of +20 degrees is 3 minutes in the past 10 minutes from the current time, when the determination processing of the cutout range is executed at 10:00. In this case, the pan angle with the longest imaging time is −20 degrees, and the partial image information of the first cutout range X1 in the frame acquired when imaging at this pan angle is included in the imaging angle of view G after changing the pan angle, as illustrated by A in FIG. 10, and thus the range to be cut out from the frame to be acquired subsequently is changed to the range illustrated by A.

In the same way, at 10:05 which is the next cutout range determination timing, the pan angle with the longest imaging time is specified as 0 degrees by the cutout range determination processing, and the range to be cut out from the frame to be acquired subsequently is changed to the range illustrated by B in FIG. 10. In the same way, at 10:10 which is the next cutout range determination timing, the pan angle with the longest imaging time is specified as +20 degrees by the cutout range determination processing, and the range to be cut out from the frame to be acquired subsequently is changed to the range illustrated by C in FIG. 10. Thereafter, when the operation for instructing the end of distribution video generation is executed ("YES" in S26), the generation processing of distribution video information ends, and when the operation for instructing the end of video capturing is executed ("YES" in S34), the imaging processing ends.

By executing the processing in this way, when the user has been imaging for a long time at the angle of view illustrated in FIG. 10, even if, for example, there is a time in which the user temporarily focuses on the person shown on the right side within the angle of view and moves the pan angle to the right side, if this is a short time, it is possible to determine that the angle in which the user is most interested is the range illustrated by B in the center. Accordingly, it is possible to cut out the range B continuously, and provide distribution image information with a stable angle of view.

According to the second embodiment described above, when the distribution image information is generated by cutting out a predetermined range of image information from imaging information, a section in which the user is most interested is determined based on the latest imaging situation, and the image information of such a section is cut out, thereby making it possible to generate the distribution image information with a stable angle of view.

The present invention makes it possible to provide an imaging device which is capable of generating distribution image information with a stable angle of view without being affected by a temporary change in the imaging direction at a small angle, when the distribution image information is generated by cutting out a predetermined range of image information from imaging information.

What is claimed is:

1. An imaging device comprising:
   an imaging unit configured to output an image signal by performing imaging processing;
   an imaging time information storage unit configured to store imaging time information for which an imaging time is calculated for each imaging direction implemented by the imaging unit, with respect to the imaging processing performed by the imaging unit in the past; and
   a distribution information generation unit configured to sequentially acquire frames from the image signal, cut out partial image information of a preset cutout range from the respective acquired frames, and generate distribution image information, wherein
   the distribution information generation unit
   specifies the imaging direction with the longest imaging time at a predetermined determination timing, from among the imaging time information stored in the imaging time information storage unit,
   determines whether the partial image information of the cutout range in a frame acquired when the specified imaging direction is captured is included in an imaging angle of view implemented during current imaging processing, and
   when it is determined as being included, cuts out a range corresponding to the partial image information of the cutout range acquired when the specified imaging direction is captured, from a frame to be acquired subsequently, thereby generating the distribution image; information.

2. The imaging device according to claim 1, further comprising:
   a pan mechanism unit configured to change the imaging direction of the imaging unit in a horizontal direction, wherein
   the distribution information generation unit sets a timing at which it is detected that the pan mechanism unit has changed the imaging direction as the predetermined determination timing.

3. The imaging device according to claim 1, wherein
   the distribution information generation unit sets a timing arriving at a predetermined time interval as the predetermined determination timing.

4. The imaging device according to claim 1, wherein
   the distribution information generation unit
   specifies the imaging direction with the longest imaging time at a predetermined determination timing, from among the imaging time information stored in the imaging time information storage unit,
   determines whether the partial image information of the cutout range in a frame acquired when the specified imaging direction is captured is included in an imaging angle of view implemented during the imaging processing, and
   when it is determined as not being included, cuts out the partial image information of the preset cutout range from a frame to be acquired subsequently, thereby generating the distribution image information.

5. The imaging device according to claim 1, wherein
   the distribution information generation unit specifies the imaging direction with the longest imaging time by using the imaging time information in a past predetermined period based on the predetermined determination timing.

6. The imaging device according to claim 1, further comprising:
   a codec unit configured to encode the distribution image information and generate distribution video image information; and a network interface unit configured to transmit the distribution video image information to an external terminal device.

7. An imaging processing method in which an imaging device, which is capable of changing an imaging direction in a horizontal direction, includes an imaging unit configured to output an image signal by performing imaging processing, wherein the imaging device stores imaging time information for which an imaging time is calculated for each imaging direction, with respect to the imaging processing performed by the imaging unit in the past, sequentially acquires frames from the image signal, cuts out partial image information of a preset cutout range from the respective acquired frames, thereby generating distribution image information, specifies the imaging direction with the longest imaging time at a predetermined determination timing, from among the stored imaging time information, determines whether the partial image information of the cutout range in a frame acquired when the specified imaging direction is captured is included in an imaging angle of view implemented during current imaging processing, and when it is determined as being included, cuts out a range corresponding to the partial image information of the cutout range acquired when the specified imaging direction is captured, from a frame to be acquired subsequently, thereby generating the distribution image information.

\* \* \* \* \*

UNITED STATES PATENT AND TRADEMARK OFFICE
CERTIFICATE OF CORRECTION

PATENT NO. : 11,991,451 B2
APPLICATION NO. : 17/955934
DATED : May 21, 2024
INVENTOR(S) : Keiji Nishimaki It is certified that error appears in the above-identified patent and that said Letters Patent is hereby corrected as shown below:

In the Claims

Claim 1, Column 12, Line 27, delete the phrase "image ; information." and replace with "image information.".

Signed and Sealed this
Second Day of July, 2024

Katherine Kelly Vidal
*Director of the United States Patent and Trademark Office*